(12) United States Patent
Medin et al.

(10) Patent No.: US 7,584,387 B1
(45) Date of Patent: *Sep. 1, 2009

(54) METHOD AND SYSTEM FOR EXTENDING THE FUNCTIONALITY OF AN ENVIRONMENTAL MONITOR FOR AN INDUSTRIAL PERSONAL COMPUTER

(76) Inventors: David T. Medin, 1305 Brockman Ave., Marion, IA (US) 52302; Matthew J. Poduska, 623 Main St., Center Point, IA (US) 52213; Christopher M. Jensen, 1917 8TH Ave. SE., Cedar Rapids, IA (US) 52403

(*) Notice: Subject to any disclaimer, the term of this patent is extended or adjusted under 35 U.S.C. 154(b) by 0 days.

This patent is subject to a terminal disclaimer.

(21) Appl. No.: 11/936,474

(22) Filed: Nov. 7, 2007

Related U.S. Application Data

(63) Continuation of application No. 10/707,748, filed on Jan. 8, 2004, now Pat. No. 7,310,750, which is a continuation of application No. 09/681,078, filed on Dec. 22, 2000, now Pat. No. 6,738,930.

(51) Int. Cl.
*G06F 11/00* (2006.01)
(52) U.S. Cl. .......................... 714/47; 714/57
(58) Field of Classification Search ................... 714/30, 714/47
See application file for complete search history.

(56) References Cited

U.S. PATENT DOCUMENTS

| | | | |
|---|---|---|---|
| 5,644,707 A | 7/1997 | Chen | |
| 5,944,839 A | 8/1999 | Isenberg | |
| 5,987,611 A | 11/1999 | Freund | |
| 6,044,476 A | 3/2000 | Ote et al. | |
| 6,146,150 A * | 11/2000 | Roberts | 439/55 |
| 6,473,709 B2 | 10/2002 | Murdock et al. | |
| 6,499,028 B1 | 12/2002 | Brock et al. | |
| 6,510,529 B1 | 1/2003 | Alexander et al. | |
| 6,526,529 B1 | 2/2003 | Miksovsky et al. | |
| 6,557,122 B1 | 4/2003 | Sugauchi et al. | |
| 6,560,611 B1 * | 5/2003 | Nine et al. | 707/104.1 |
| 6,629,267 B1 | 9/2003 | Glerum et al. | |
| 6,714,977 B1 | 3/2004 | Fowler et al. | |
| 6,738,930 B1 * | 5/2004 | Medin et al. | 714/30 |
| 6,823,478 B1 * | 11/2004 | Prologo et al. | 714/38 |
| 6,859,831 B1 | 2/2005 | Gelvin et al. | |
| 6,874,691 B1 | 4/2005 | Hildebrand et al. | |
| 6,883,032 B1 * | 4/2005 | Dempski | 709/229 |
| 7,000,010 B1 | 2/2006 | Jensen et al. | |
| 7,035,898 B1 * | 4/2006 | Baker | 709/203 |
| 7,117,239 B1 * | 10/2006 | Hansen | 709/200 |
| 7,310,750 B1 * | 12/2007 | Medin et al. | 714/47 |
| 2002/0078382 A1 * | 6/2002 | Sheikh et al. | 713/201 |
| 2003/0217100 A1 | 11/2003 | Kronk | |
| 2008/0320339 A1 * | 12/2008 | McLellan et al. | 714/47 |

\* cited by examiner

*Primary Examiner*—Scott T Baderman
*Assistant Examiner*—Paul F. Contino

(57) ABSTRACT

A system and method for enhancing the functionality of a dual opposing ISA/PCI bus alarm card of an industrial computer where the alarm card includes a microserver for communicating with web-enabled information on the host computer.

16 Claims, 2 Drawing Sheets

METHOD AND SYSTEM FOR EXTENDING THE FUNCTIONALITY OF AN ENVIRONMENTAL MONITOR FOR AN INDUSTRIAL PERSONAL COMPUTER

CROSS-REFERENCE TO RELATED APPLICATIONS

This is a continuation application of an application entitled "Method and System for Extending the Functionality of an Environmental Monitor for an Industrial Personal Computer" by David T. Medin, Matthew J. Poduska and Christopher M. Jensen, application Ser. No. 10/707,748 and filed on Jan. 8, 2004, which itself was a continuation of an application with the same title by the same inventors, application Ser. No. 09/681,078 and filed on Dec. 22, 2000, which application has now issued as U.S. Pat. No. 6,738,930 on May 18, 2004, which application and issued patent are incorporated herein in their entirety by this reference.

FIELD OF THE INVENTION

The present invention generally relates to computers, and more particularly relates to personal computers, and even more particularly relates to monitors and environmental monitors for industrial personal computers.

BACKGROUND OF THE INVENTION

In recent years, industrial personal computers have become increasingly prevalent in many industries. It is not uncommon today to see installations with rows of industrial PCs arranged in racks. While many of these industrial PCs are often designed and manufactured to higher standards than consumer PCs, they still are occasionally in need of repair, and down time can be expensive and problematic for many industrial PC users. Consequently, users of industrial PCs will often desire to monitor the interior and exterior environments of such PCs. Monitoring the PCs can help to predict, postpone, and eliminate some industrial PC failures. Remote environmental monitoring, via an "out-of-band" environmental monitor disposed in the industrial PC, can be most beneficial with geographically dispersed computer networks. Such remote monitoring has been successfully performed with prior art monitors. Additionally, some of these "out-of-band" environmental monitors have even been enhanced to permit shutting down the Windows NT operating system on the remotely located industrial PC.

While these function enhanced alarm cards have been used extensively in the past, they do have some drawbacks. First of all, their functionality has been primarily limited to monitoring of preset environmental conditions. Typically, these preset environmental conditions are established at the time the industrial PC or the alarm card, or both, are initially configured for operation. However, over time, the desires of an industrial PC administrator may change. When this occurs, it is then necessary to change the preset configurations. Often, it is difficult to change the parameters being monitored. Typically, the host PC would need to be opened, the alarm card would need to be removed and replaced, or at least reconfigured. It has often been extremely difficult, if not impossible, to reconfigure the monitored parameters of an industrial PC from a remote administration facility. Secondly, when the main microprocessor for the industrial PC failed, crashed, or otherwise hung up, it was then nearly impossible to determine information about the reason for the crash if such information was dependent, in some way, upon that main microprocessor for reporting, etc.

Consequently, there exists a need for improved methods and systems for monitoring and extending the monitoring capabilities of a monitor for an industrial PC.

SUMMARY OF THE INVENTION

It is an object of the present invention to provide a system and method for extending, in an efficient manner, the functionality of an alarm card in an industrial personal computer.

It is a feature of the present invention to utilize a microserver, disposed in the alarm card for retrieving from the host industrial PC, web-enabled content.

It is another feature of the present invention to include a direct connection between the alarm card and the host CPU, via a well-known data link scheme.

It is another feature of the present invention to include on the host computer an agent which communicates with the microserver.

It is yet another feature of the present invention to include a user configurable software scheme, disposed on the host computer, for changing parameters to be monitored by the alarm card.

It is an advantage of the present invention to achieve improved efficiency in enhancing the functionality of environmental monitoring functions in industrial personal computers.

It is another advantage of the present invention to provide an alarm card with enhanced capabilities.

The present invention is an apparatus and method for enhancing the functionality of alarm cards in industrial personal computers designed to satisfy the aforementioned needs, provide the previously stated objects, include the above-listed features, and achieve the already articulated advantages. The present invention is carried out in a "technician-less" manner in a sense that the time consumed by a technician with opening the case for enhancing or changing the functionality of a monitor of an industrial PC, has been greatly reduced, if not eliminated, in certain circumstances.

Accordingly, the present invention is a system and method including a microserver disposed on an alarm card, the microserver for accessing web-enabled information on the host computer.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
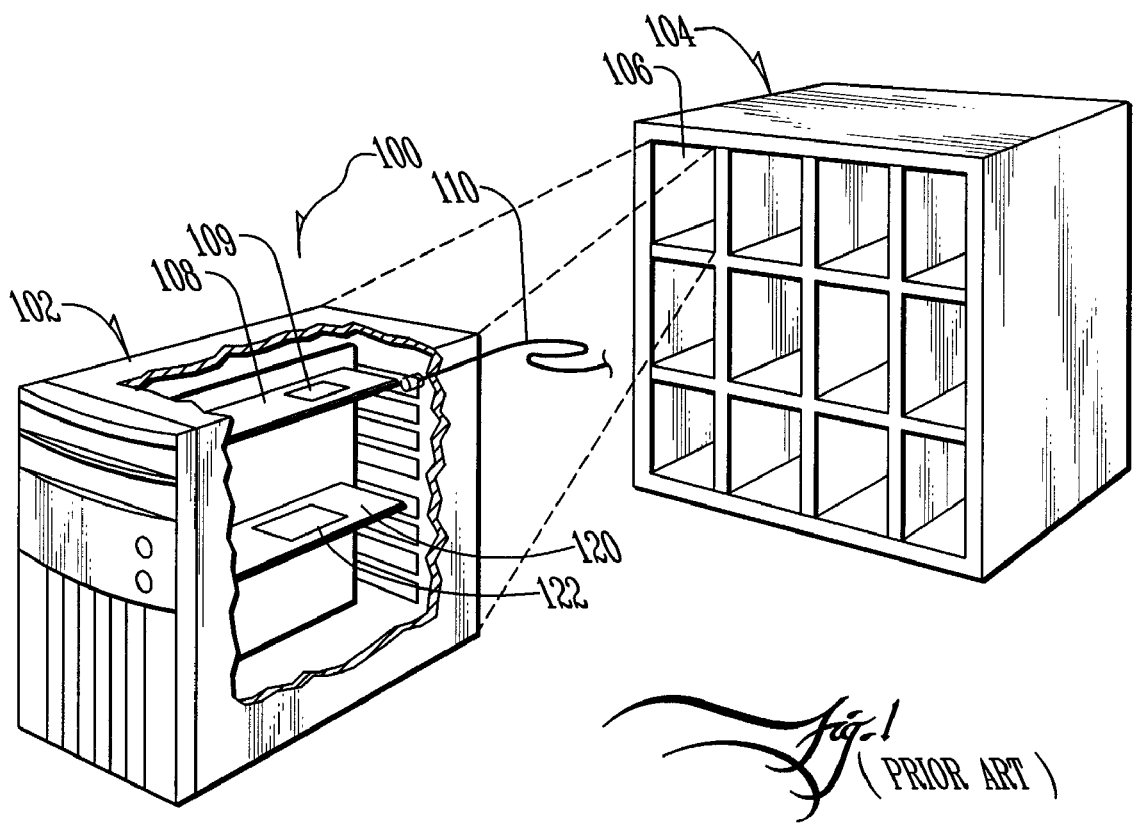
FIG. 1 is a simplified view of a system of the prior art.

Now referring to the drawings wherein like numerals refer to like matter throughout, and more specifically referring to FIG. 1, there is shown a system of the prior art, generally designated 100, including an industrial PC 102, for insertion into a rack 104, having an empty slot 106 therein. The PC 102 has a motherboard card 120 with a host CPU 122 thereon. Also in PC 102 is an alarm card 108 having an alarm card CPU 109 thereon with an "out-of-band" external communication port for communicating with an external network.

Figure 2:
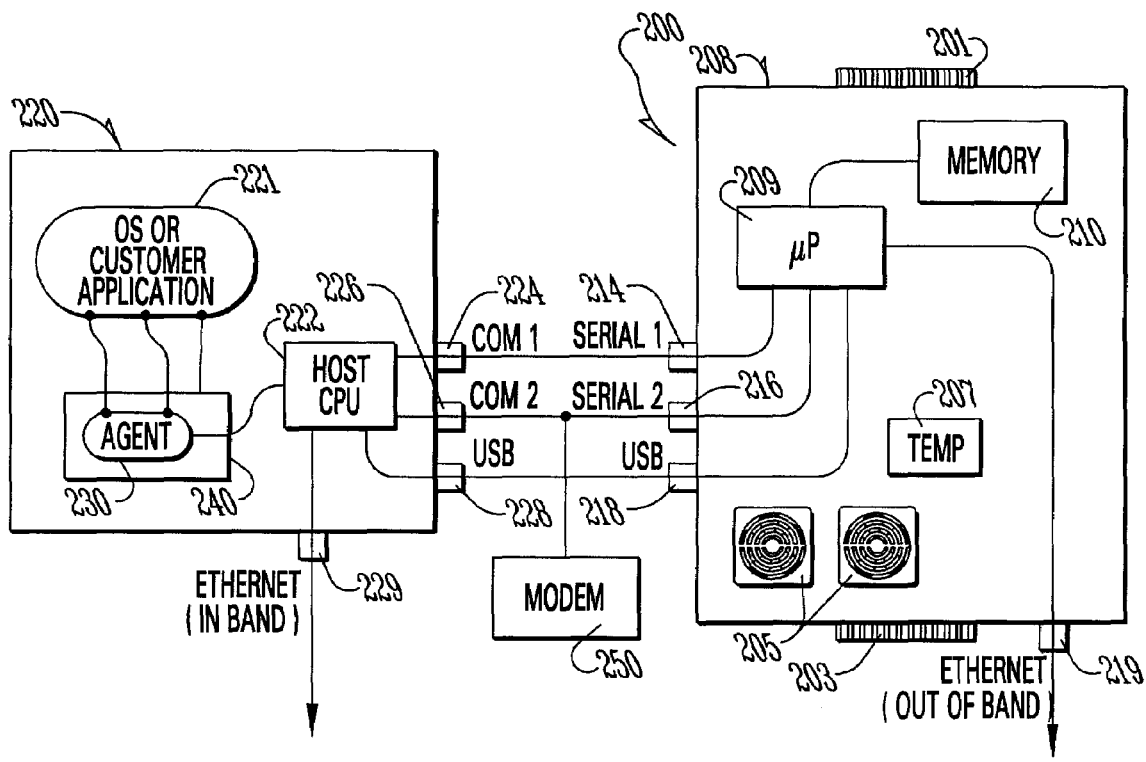
FIG. 2 is a simplified view of a system of the present invention.

A detailed understanding of the present invention can be achieved by now referring to FIG. 2, which shows a combination of circuit cards, of a portion of an industrial personal computer generally designated 200, including a host CPU card 220, which can be either a motherboard or a CPU card (for use with a passive backplane) and an alarm card 208, which includes an alarm card microprocessor 209, an alarm card #1 serial port 214, an alarm card #2 serial port 216, USB port 218. In a preferred embodiment, alarm card 208 has ISA bus connections 201 and PCI bus connections 203 on opposing sides of the card 208 so it may be deployed in a PC with either type of expansion bus by merely flipping the card 208 over. The host CPU card 220 provides the primary processing capabilities for industrial personal computer 200 and the alarm card 208 provides several functions, including typical alarm card functions of monitoring and reporting environmental conditions in PC 200, such as temperatures 207, fans 205, power levels, etc. Similar to prior art alarm cards, alarm card 208 also includes a capability of "out-of-band" reporting and communication via alarm card Ethernet port 219. Ethernet is a preferred port, but any communication scheme capable of digital communication could be used as well. Alarm card Ethernet port 219 may be coupled to the internet or a proprietary network depending upon user's preferences. A remote administrator (not shown) can access the alarm card 208 via alarm card Ethernet port 219. One of the key novel aspects of the present invention is that a microserver, of the type which is well known in the art and is capable of handling "IP-based-content", resides in memory 210 on alarm card 208 and is accessible via alarm card Ethernet port 219. The term "IP-based-content" is intended to include, but not be limited to, content in the following formats: SNMP, HTTP, Telnet, etc. Now, any information on the PC 200 which is accessible by alarm card microprocessor 209 is accessible through the microserver and the Ethernet port 219. A software agent 230 is disposed in memory 240 on host CPU card 220. The purpose of agent 230 is as follows: Agent 230 gathers information from the alarm card 208 for its own use and for reporting via an in-band connection through Ethernet port 229, agent 230 also performs the function of extracting information desired to be monitored from the OS or customer application 221 and rendering it in an industry standard format, so that it appears that the alarm card were measuring the information directly. The Agent also extracts information from the alarm card and makes it available to the OS or applications running on the host CPU. The agent could be as simple as the customer application generating an HTML file that it keeps updated with the values desired to be observed. OS and customer application 221 are shown as a single object on the host CPU card 220. This is done to highlight that there are connections between these and the agent 230. It should be understood that they need not be located on the host CPU card nor need they be combined in a single object.

Alarm card 208 and host CPU card 220 are coupled together in several ways. For example, the COM 1 port 224 of host CPU card 220 is coupled to the SERIAL 1 port 214 on alarm card 208. Similarly, COM 2 port 226 is coupled to SERIAL 2 port 216 and USB port 228 is coupled to USB port 218. Also, while it is not the preferred path of communication between alarm card 208 and host CPU card 220, the two Ethernet ports 219 and 229 could be interconnected through an internet or other network connection. SERIAL 2 port 216 and COM 2 port 226 may be coupled to a modem 250 and then via an external telephone network (not shown) to a remote administrator.

In operation, the apparatus and method of the present invention could function as follows: an alarm card 208 disposed inside of PC 200 monitors various environmental conditions therein. This information is then provided to the PC 200 via The COM 1 port 224 and Serial 1 port 214 connection and to remote users via Ethernet port 219. Due to the micro servers on host CPU card 220 and alarm card 208, much additional information can also be communicated. Alarm card 208 can maintain a web page cache, where it stores in memory 210 web pages available from host CPU card 220. One example of a very desirable web page cache would be a cache of the most recent web pages which contain status, activity, and performance information regarding the operation of host CPU 222. If alarm card 208 continuously stores the most few current web pages, then if host CPU 222 were to crash, the source of the crash or at least the status, activity, and performance of host CPU 222 immediately before its crash could be available through an out-of-band Ethernet port 219. The utility of such information could be considerable. With the help of a dial-up connection through the COM 2-Serial 2 connections, for example, and the information available through the out-of-band Ethernet connection, the host CPU 222 might be rebooted. If the PC 200 is not completely crashed, it may be possible and desirable to remotely shut it down, in a more "delicate" way than a hard restart with all of its consequences. The agent 230 may be operating system independent communication interfaces, such as the PPP protocol.

Another very important operational feature of the present invention is the ability of the alarm card to be extended or changed while in service in the field. Often the needs of an industrial PC user can change over time. If the alarm card can be extensible remotely, without the need for an outside technician, then numerous quite beneficial changes, fixes, upgrades, etc., which might not be economically justified if an on-site service call were required, become available. One approach to carrying out this in the field service is to use code on the PC 200, such as the agent 230 or micro servers etc., stored in the memory 240, which can be readily edited on the PC 200, either remotely through the in-band network connection or locally. If the web pages on the Host CPU card 220 or elsewhere in PC 200 which are available for monitoring by the alarm card 208 are changed, by relatively easy code changes to the code (agent 230 or micro-servers stored on memory 240) running on the host CPU 222, then the capabilities of the alarm card can thusly be very easily changed. The prior art methods of having to remove the alarm card or create proprietary application extensions to make a change become much less attractive than the innovative methods for effecting changes which are enabled by the present invention. Now end users can readily remotely customize the operation of their environmental monitors. This is not a trivial advantage.

Throughout this description, reference is made to an industrial PC and to an Ethernet, because it is believed that the beneficial aspects of the present invention would be most readily apparent when used in connection with industrial PCs and Ethernet connections; however, it should be understood that the present invention is not intended to be limited to industrial PCs and Ethernet connections and should be hereby construed to include other non-industrial PCs and non-Ethernet applications as well.

Throughout this description, references have been made to monitoring environmental conditions in a Host computer. It should be understood that the present invention is also applicable to monitoring conditions or parameters within the host PC which relate to the OS and customer applications 221. In fact, these OS and customer application conditions or parameters could be monitored instead of the environmental conditions.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. An apparatus comprising:
a microprocessor configured to send commands to a server and to process web-based content;
an out-of-band connection to a network; and
an internal connection to a host CPU wherein via the internal connection, web-based content at the host CPU is configured to be monitored; wherein, via the out-of-band connection, information contained in the web-based content on the host CPU is reported to an external network; and wherein the information are remotely programmable environmental characteristics of the host CPU.

2. The apparatus of claim 1 wherein the remotely programmable environmental characteristics are remotely programmable via an in-band network connection between the host CPU and the external network.

3. The apparatus of claim 2 further comprising a monitor memory having therein a web page cache for storing environmental status web pages obtained from the host CPU.

4. The apparatus of claim 3 wherein the environmental status web pages are available to the external network, via the out-of-band connection, despite any crash occurring on the host CPU.

5. The apparatus of claim 4 wherein the monitor has both ISA bus connections and PCI bus connections thereon and further such that the ISA bus connections are on an opposite side of the monitor from said PCI bus connections.

6. The apparatus of claim 1 wherein the monitor has both ISA bus connections and PCI bus connections thereon and further such that the ISA bus connections are on an opposite side of said monitor from said PCI bus connections.

7. A method of monitoring a computer, the method comprising:
establishing a first connection between a first computer having a host CPU and an administrator computer; and
monitoring, on the first computer, pages contained on the host CPU and editing the pages on the host CPU via the first connection.

8. The method of claim 7 further comprising:
saving the pages in a memory cache on a monitor.

9. The method of claim 8 further comprising:
reporting information from the pages to the administrator computer via a second connection during a time when the first connection is inoperable due to a failure of the host CPU.

10. The method of claim 9 further comprising:
analyzing the information from the pages and making a determination relating to the failure of the host CPU; and,
restarting the host CPU via the second connection.

11. The method of claim 10 further comprising: making changes to software on the first computer, after restarting the host CPU, wherein the changes are effected by the determination.

12. A method of claim 11 wherein said monitor has both ISA bus connections and PCI bus connections thereon and further such that the ISA bus connections are on an opposite side of said monitor from said PCI bus connections.

13. The method of monitoring of claim 7 wherein the monitor has both ISA bus connections and PCI bus connections thereon and further such that the ISA bus connections are on an opposite side of the monitor from said PCI bus connections.

14. An apparatus comprising:
a first computer having a first network means and a second network means, wherein the first network means exchanges information between the first computer and a second computer and the second network means exchanges information between the first computer and the second computer;
means for maintaining the second network means operable despite an operational failure of the first network means;
means for hosting a page on the first computer; and,
means, internal to the first computer, for monitoring the page and providing related information on the second network means.

15. The apparatus of claim 14 wherein the means for hosting a page permits changes to be made to the page from a location not co-located with the first computer.

16. The apparatus of claim 15 wherein the means, internal to the first computer, for monitoring includes ISA bus connections and PCI bus connections thereon and the ISA bus connections are on an opposite side from said PCI bus connections.

* * * * *